United States Patent
Bose et al.

(10) Patent No.: US 11,916,809 B2
(45) Date of Patent: Feb. 27, 2024

(54) AUTONOMOUS OPERATION OF EDGE-BASED DEPLOYMENTS

(71) Applicant: MICROSOFT TECHNOLOGY LICENSING, LLC, Redmond, WA (US)

(72) Inventors: Rahul Bose, Acton, MA (US); Mark Gordon Libby, Groton, MA (US); Anand Muthurajan, Groton, MA (US); Ronald Mark Parker, Manchester, MA (US); Michael Anthony Brown, McKinney, TX (US); Leland Douglas Benson, Broomfield, CO (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 7 days.

(21) Appl. No.: 17/733,745

(22) Filed: Apr. 29, 2022

(65) Prior Publication Data

US 2023/0353504 A1    Nov. 2, 2023

(51) Int. Cl.
*H04L 47/70* (2022.01)
*H04L 47/78* (2022.01)

(52) U.S. Cl.
CPC ............ *H04L 47/82* (2013.01); *H04L 47/788* (2013.01)

(58) Field of Classification Search
CPC .............................. H04L 47/82; H04L 47/788
See application file for complete search history.

(56) References Cited

U.S. PATENT DOCUMENTS

| | | |
|---|---|---|
| 2011/0055372 A1 | 3/2011 | Elyashev et al. |
| 2015/0249586 A1* | 9/2015 | Byers ................. H04L 43/0805 709/224 |
| 2017/0083354 A1 | 3/2017 | Thomas et al. |
| 2017/0085488 A1* | 3/2017 | Bhattacharya ........ H04L 41/122 |
| 2018/0167483 A1* | 6/2018 | Cannon ................. H04L 67/568 |
| 2019/0334993 A1* | 10/2019 | Gkoufas ................. H04L 67/10 |
| 2021/0168092 A1* | 6/2021 | Gupta ................... H04L 47/783 |
| 2022/0061059 A1 | 2/2022 | Dunsmore et al. |
| 2022/0067140 A1* | 3/2022 | Cambou ................ G06F 21/45 |
| 2022/0210009 A1* | 6/2022 | A ........................ H04L 41/0893 |
| 2022/0255731 A1* | 8/2022 | Modica ................. H04L 9/085 |

FOREIGN PATENT DOCUMENTS

CN    112448858 A    3/2021

OTHER PUBLICATIONS

"International Search Report and Written Opinion Issued in PCT Application No. PCT/US23/012761", dated May 11, 2023, 14 Pages.

\* cited by examiner

*Primary Examiner* — Michael A Keller
*Assistant Examiner* — Zonghua Du
(74) *Attorney, Agent, or Firm* — Newport IP, LLC; Han K. Gim

(57) ABSTRACT

Computing resources are managed in a computing network comprising a computing service provider and an edge computing network. The edge computing network receives an indication of a disconnection of communications between the computing service provider and the edge computing network. In response to the indication, the edge computing network initiates an autonomous mode at the edge computing network. The edge computing network is configured to continue providing computing and network services at the edge computing network while the edge computing network is operating in the autonomous mode.

20 Claims, 12 Drawing Sheets

AUTONOMOUS OPERATION OF EDGE-BASED DEPLOYMENTS

BACKGROUND

A data center may house computer systems and various networking, storage, and other related components. Data centers may, for example, be used by service providers to provide computing services to businesses and individuals as a remote computing service or provide "software as a service" (e.g., cloud computing). Service providers may also utilize edge sites that may include a geographically distributed group of servers and other devices that work together to provide delivery of content to end-users of data center services. The edge sites may be fixed or mobile, and provide extend the data center's services to areas served by the edge sites.

It is with respect to these considerations and others that the disclosure made herein is presented.

SUMMARY

In various embodiments, users of a computing service such as a cloud computing service may be provided use of such services via computing and storage resources of the computing service at a remote location ("edge site"). The users may continue to benefit from the computing services, while aspects of the services are incorporated into the edge sites. Edge sites enable a data center to extend cloud services to local deployments using a distributed architecture that enables federated options for local and remote data and control management.

In some cases, the cloud computing service provider may lose connectivity with an edge site. Additionally, disconnection with an edge site (e.g., a mobile edge site) may be designed for and planned as a management action or intentional disconnection. In the first scenario, connectivity may be lost for a variety of reasons, such as a physical event that causes loss of network services, a denial-of-service attack, or an undetected event that causes significant latency or loss of communications. The complexities of edge site implementations may present challenges when connectivity issues arise between the cloud computing service provider and the edge site, potentially preventing the edge site from operating properly due to the loss of connectivity or operating with limited connectivity. In the case of an intentional disconnection, an edge site may be intended to or otherwise expected to operate in a disconnected mode. For example, a mobile edge site may be intended to operate in an environment with little/no connectivity such as in a deep-sea environment.

The present disclosure provides various techniques and functions that allow for a disconnected or compromised edge site to continue providing services to users serviced by the edge site. Various implementations allow for the edge site to provide a range of functionality from complete service (no loss of functionality) or limited service while the edge site is disconnected. As used herein, an edge site that operates in a disconnected capacity may be referred to as operating in an autonomous mode.

When the disconnection is unplanned, the present disclosure includes mechanisms that allow the edge site to make a determination as to whether the edge site should enter the autonomous mode. The edge site may have functionality to detect loss of connectivity or limited connectivity and automatically enter the autonomous mode.

The autonomous mode may also be entered manually, for example to test features of the autonomous mode. The edge site may have functionality to detect the recovery of connectivity and automatically exit the autonomous mode.

The present disclosure additionally provides for management and tracking of the edge site while the edge site is operating in autonomous mode. The edge site may be configured to operate in at least two modes (connected and autonomous).

The described techniques can allow for continued delivery of services by an edge computing network, maintaining security of data and data access, and prevention of data loss, while maintaining efficient use of computing resources such as processor cycles, memory, network bandwidth, and power during operation of the edge computing network during the described conditions.

This Summary is provided to introduce a selection of concepts in a simplified form that are further described below in the Detailed Description. This Summary is not intended to identify all of the key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1A:
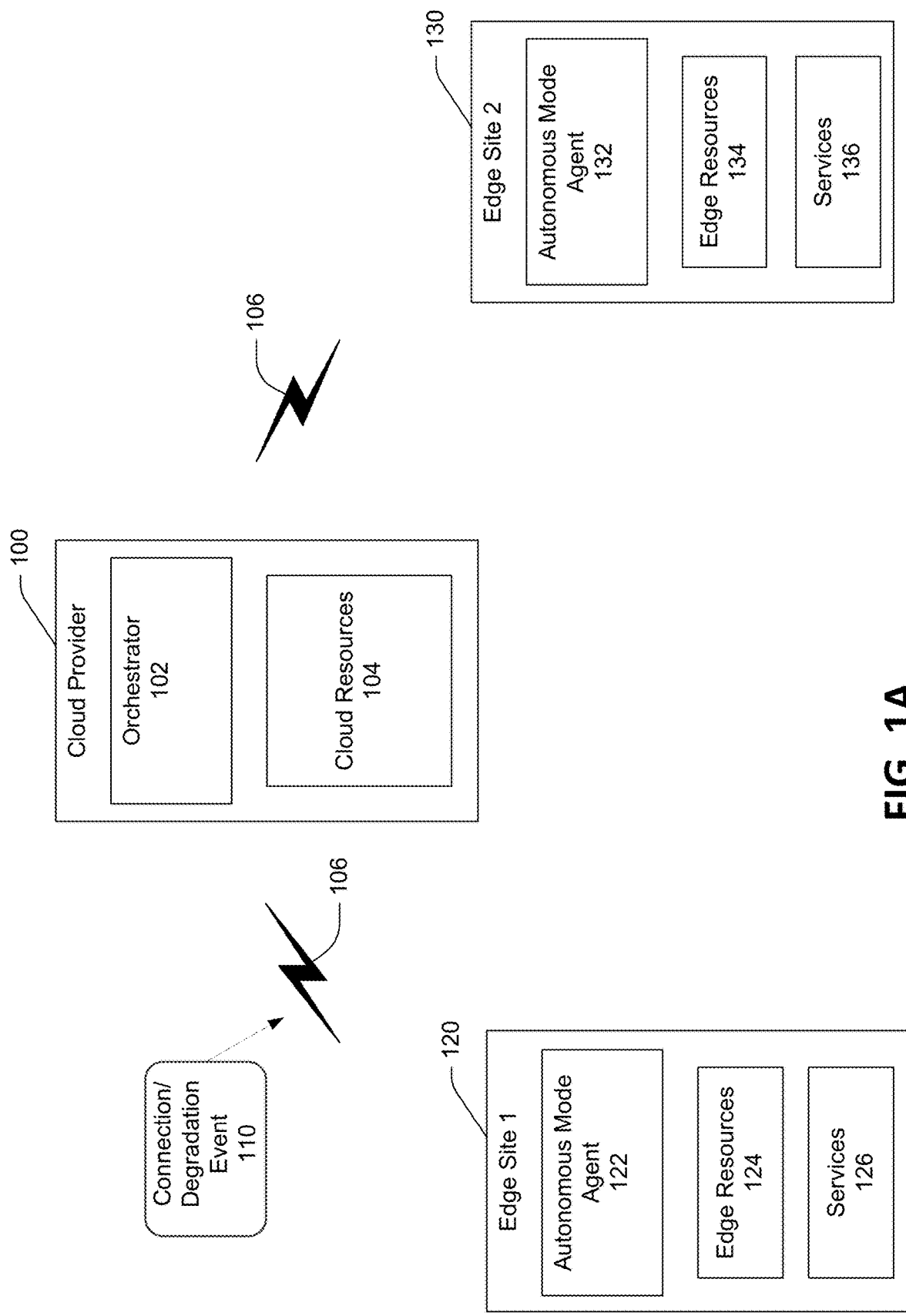
FIG. 1A is a diagram illustrating an example architecture in accordance with the present disclosure.

In some computing environments that provide virtualized computing and storage services, various computing and network services may be configured to enable the service provider to deploy their footprints closer to the user's premises, thereby extending the reach of the computing and network services closer to the user premises. For example, an enterprise that provides network carrier services may want computing services located closer to their networks or their customers, or a manufacturer may want to deploy computing resources closer to their facilities. Users of virtualized computing resources may benefit in many ways by deploying resources such as virtual machines on resources that are located closer to their premises. Additionally, localization of computing and storage devices may enable some users to more effectively meet data residency, compliance, latency, and other requirements, while continuing to benefit from many of the advantages of utilizing remote and/or virtualized computing services, such as scalability and flexibility. As used herein, "resources" may refer to various types of multi-dimensional resources including CPU, GPU, memory, etc.

Efficient management of the end-to-end capability services by the service provider can enable an equivalent experience when using edge sites. The integration of local and remote resources with a comprehensive remote resource management approach can minimize the overhead for the service provider by maximizing the capabilities of the edge site. The effective distribution of the management functions can be determined based on the implications for various performance and security implications such as latency and data security.

The present disclosure enables the operation of edge sites during periods of time when the edge site is operating in an autonomous mode, where the edge site has limited or no connectivity to the main data center. Various embodiment may enable the continued processing and distribution of tasks and workloads to computing resources so as to efficiently deliver services and allow the service provider to continue delivering services in an effective manner.

Management of end-to-end services by the service provider can enable an experience that is seamless and consistent between connected and autonomous operation at the edge site. The integration of local and remote resources with a comprehensive resource management approach can minimize the overhead for the user, who will not need to perform complex management tasks. The effective distribution of the workloads can be determined based on the implications for various performance and security implications such as latency and data security.

The present disclosure provides various techniques and functions that allow for a disconnected or compromised edge site to continue providing services to users serviced by the edge site. Various implementations allow for the edge site to provide a range of functionality from complete service (no loss of functionality) or limited service while the edge site is disconnected. As used herein, an edge site that operates in a disconnected capacity may be referred to as operating in an autonomous mode.

When the disconnection is unplanned, the present disclosure includes mechanisms that allow the edge site to make a determination as to whether the edge site should enter the autonomous mode. The edge site may have functionality to detect loss of connectivity or limited connectivity and automatically enter the autonomous mode.

The autonomous mode may also be entered manually, for example to test features of the autonomous mode. The edge site may have functionality to detect the recovery of connectivity and automatically exit the autonomous mode.

The present disclosure additionally provides for management and tracking of the edge site while the edge site is operating in autonomous mode. The edge site may be configured to operate in at least two modes (connected and autonomous).

In some embodiments, management features of the edge site during autonomous operation may include the ability to modify or reconfigure software and data at the edge site. For example, applications running on computing resources at the edge site may be updated to a new version if such upgrades would have been available if the edge site was connected to the main data center. Software running at the edge site or data stored at the edge may be modified by users serviced at the edge site. In an embodiment, the management features may provide the ability to provide deployment of new features while disconnected. For example, upgrades to functionality may be pushed out to edge sites for deployment prior to autonomous mode, where the edge sites may be enabled to deploy the updates when operating in an autonomous mode.

In some embodiments, management features of the edge site during autonomous operation may include the capability to observe and monitor system operation and health while disconnected. In one embodiment, functionality may be provided at the edge site that continues to update and collect logs, metrics, key performance indicators (KPIs), and other data to allow for monitoring operation services at the edge site as well as perform maintenance and troubleshooting.

In some embodiments, management features of the edge site during autonomous operation may include the scaling of various services. For example, at least some services may be scaled down if the net capacity for a given service is reduced when disconnected from the main data center.

In some embodiments, management features of the edge site during autonomous operation may include identity and access management, thus providing the edge site with the ability to allow for continued secure access to data and resources by authorized users of the edge site. The management features of the edge site during autonomous operation may also provide for management of sensitive data including secrets (e.g., certificates, keys).

During autonomous operation, management features of the edge site may perform continuous tracking of the usage of various resources provided by the edge site at various levels of granularity including resource usage at a user level. The tracking of resource usage may enable the service provider to maintain data for billing and other purposes while the edge site is operating in autonomous mode. The management features of the edge site may select various metrics to track usage and performance, which may involve selection of key performance data at various levels of data granularity and frequency.

In some embodiments, functional features of the edge site during autonomous operation may include the ability to provide communications services to user devices of the edge site. For example, the edge site may continue to provide device to device communication services on a selective basis.

The present disclosure additionally describes methods for reconciliation and resynchronization between the edge site and cloud computing service provider when connectivity is restored. Reconciliation and resynchronization may include synchronization of states due to local edge state changes which may be recorded while the edge site is operating in autonomous mode. Reconciliation and resynchronization may also include changes made at the cloud computing service provider that were not synchronized to the edge site during autonomous operation. In some embodiments, simulation techniques may be implemented to simulate interfaces to the cloud provider as well as other connected interfaces to enable autonomous operation of the edge site. For example, a digital twin may be implemented at the cloud computing service provider to simulate operation of the edge site while the edge site is in autonomous mode.

Referring to the appended drawings, in which like numerals represent like elements throughout the several FIGURES, aspects of various technologies for remote management of computing resources will be described. In the following detailed description, references are made to the accompanying drawings that form a part hereof, and which are shown by way of illustration specific configurations or examples.

With reference to FIG. 1A, illustrated is one example architecture for providing autonomous operation of edge sites in accordance with the present disclosure. In an embodiment, the architecture may include an edge site 1 120 that includes an autonomous mode agent 122. The edge site 1 120 may include edge resources 124 and services 126. In an embodiment, the architecture may include edge site 2 130 that includes an autonomous mode agent 132. The network edge 130 may include edge resources 134 and services 136. In an embodiment, the architecture may include a cloud provider node 100 with orchestrator 102. The cloud provider node 100 may include cloud resources 104. The orchestrator 102 may cooperate with autonomous mode agent 122 and autonomous mode agent 132 to coordinate and distribute tasks and processes. The cloud provider node 100 may communicate with edge site 1 120 and edge site 2 130 via communications links 106.

Figure 1B:
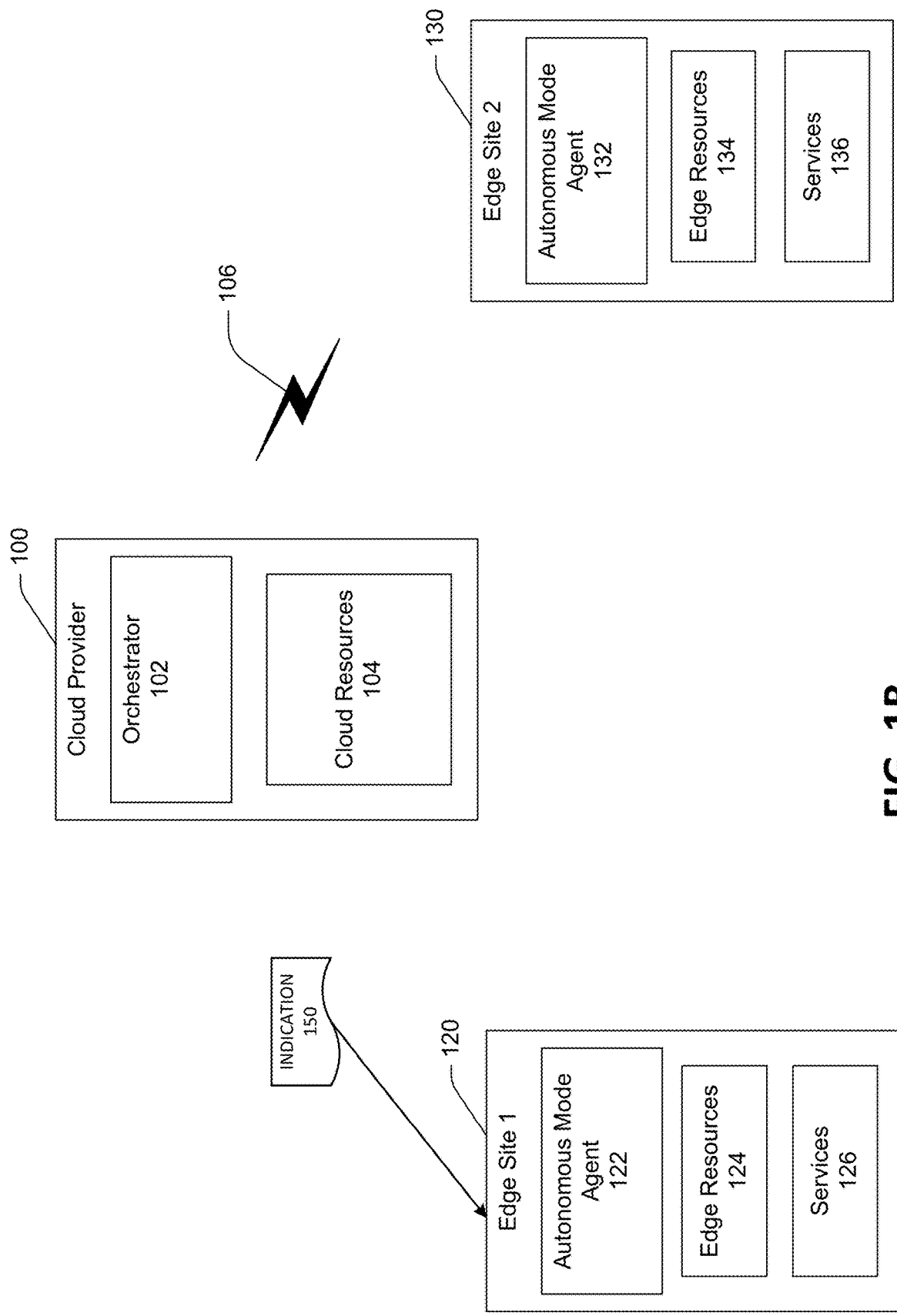
FIG. 1B is a diagram illustrating an example architecture in accordance with the present disclosure.
Figure 1C:
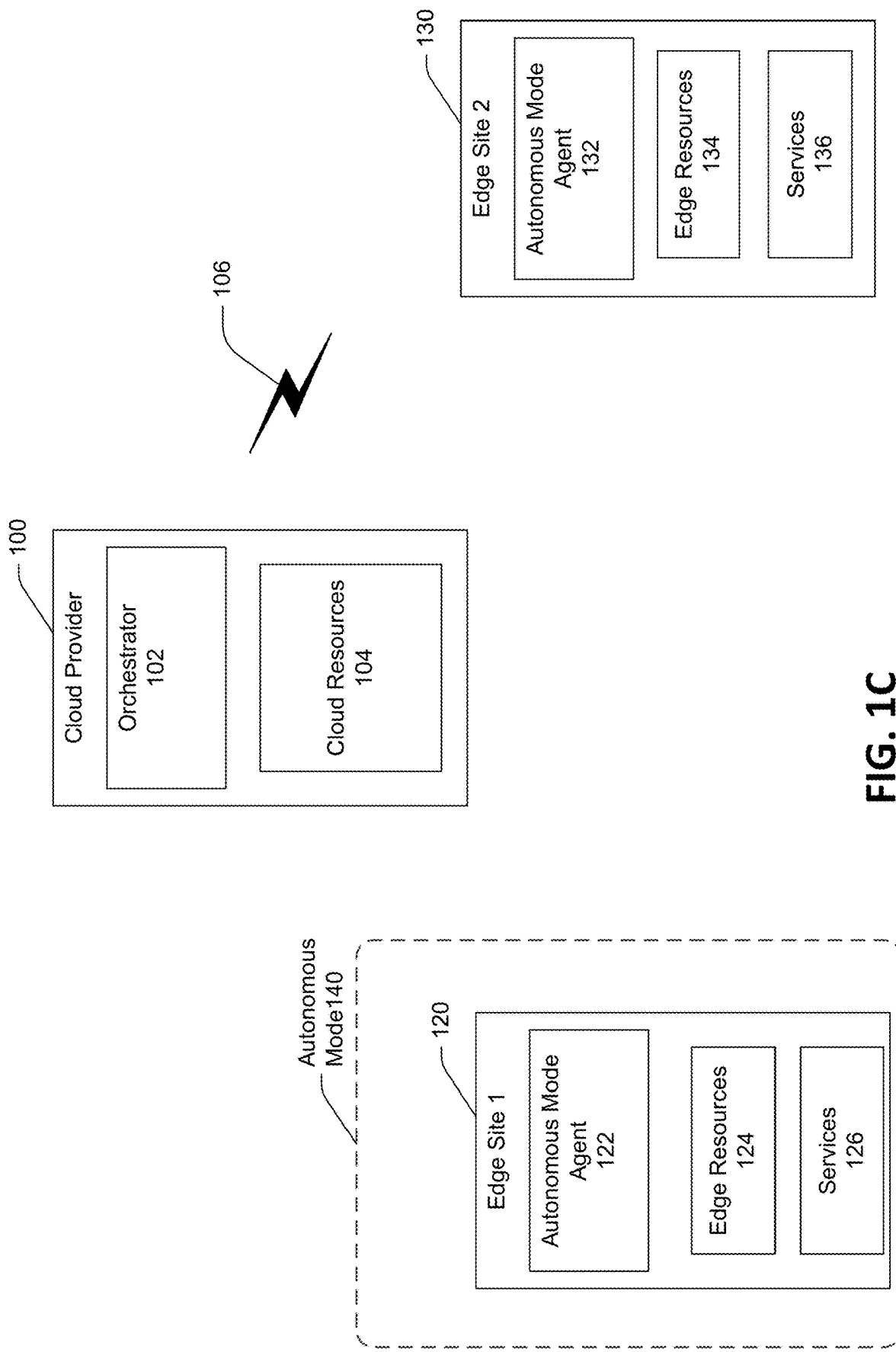
FIG. 1C is a diagram illustrating an example architecture in accordance with the present disclosure.

In one example, a connection event 110 may occur between cloud provider node 100 and edge site 1 120. The connection/degradation event 110 may be a planned event or an unplanned event. Referring to FIG. 1B, a loss of communications between cloud provider node 100 and edge site 1 120 is provided by indication 150. Referring to FIG. 1C, indication 150 that indicates a loss or degradation of communications between cloud provider node 100 and edge site 1 120 may result in the edge site 1 120 operating in autonomous mode 140.

Figure 2:
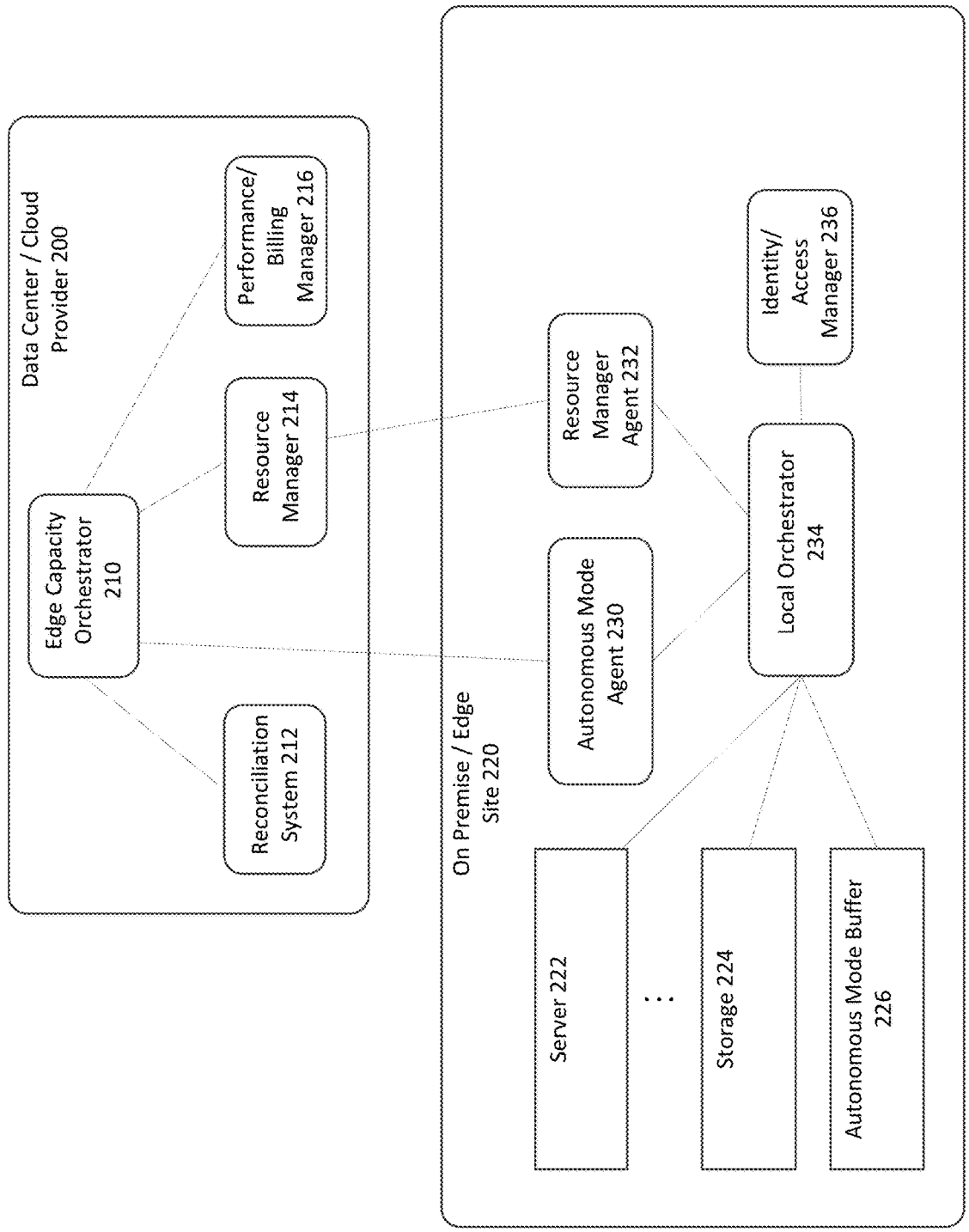
FIG. 2 is a diagram illustrating an example architecture in accordance with the present disclosure.

Referring to FIG. 2, illustrated is an example architecture illustrating functions and components that may be implemented to enable autonomous operation. Although the functions and components are illustrated as separate entities, it should be understood that the functions and components may be combined into a lesser number of entities. The architecture of FIG. 2 may include an on-premise/edge site 220 that includes a local autonomous mode agent. The on-premise/edge site 220 may include resources such as servers 222 and storage devices 224, and can run services on virtual machines, containers, etc. An edge capacity orchestrator 210 at the data center/cloud provider 200 may cooperate with an autonomous mode agent 230 and resource manager agent 232 at the edge site 220 to distribute and coordinate tasks while the edge site 220 still has connectivity to the data center 200.

The autonomous mode agent 230 may be a service running on the on-premise/edge site 220 that is configured to monitor connectivity conditions and track workloads that are being processed at the edge site 220 and determine how to handle pending tasks in the event of a connectivity event. The autonomous mode agent 230 may monitor various metrics including availability and other local conditions. The autonomous mode agent 230 may be configured to receive requests for operations from the edge capacity orchestrator 210 at the data center 200.

The autonomous mode agent 230 may be configured to control interfaces of the edge site 220 when the edge site 220 is disconnected, whether the disconnection is planned or unplanned. In the event of an unplanned disconnection, or if there is an indication of potentially malicious activity, the interfaces of the edge site 220 may fail closed and block access to the interfaces in the event of a failure/exception. In other cases, the interfaces of the edge site 220 may fail open and allow access to the interfaces in the event of a failure/exception.

The architecture shown in FIG. 2 may include a local resource manager agent 232 and a local orchestrator 234. The edge capacity orchestrator 210 may send operations to the local orchestrator 234 to perform requested operations at the on-premise/edge site 220. The resource manager agent 232 may monitor the current status of all resources at the edge site 220 and coordinate with the local orchestrator 234 for performing autonomous actions as needed.

The edge capacity orchestrator 210 may be configured to receive information pertaining to connectivity conditions and resources in the edge site 220. The information may be used to determine whether workloads should be processed at the edge site 220 or whether a workload should be migrated to the data center 200 if there is a pending connectivity event.

A resource manager 214 at the data center 200 may be configured to maintain a list of all resources at the edge site 220, their capabilities, and what workloads are currently running on each resource. The reconciliation system 212 may access this information and identify what areas need to be reconciled when connectivity is resumed after an autonomous event. The performance/billing manager 216 may be configured to track metrics for potential billing to users during autonomous operation.

The functionality provided at the data center 200 and edge site 220 allow for the edge site 220 to operate as a disconnected or autonomous edge site and continue providing services to users serviced by the edge site 220. In an embodiment, the autonomous mode agent 230 determines whether the edge site should enter an autonomous mode in which the edge site operates in a disconnected manner or with otherwise reduced connectivity. The autonomous mode agent 230 may detect loss of connectivity or limited connectivity and automatically cause the edge site 220 to enter the autonomous mode. In an embodiment, the autonomous mode agent 230 may make the determination based on a threshold and a plurality of network metrics. In some embodiments, the autonomous mode may also be entered manually, for example to test features of the autonomous mode. The autonomous mode may also be entered when the edge site is intended to operate autonomously for at least a predetermined period of time.

If the edge site 220 enters autonomous mode due to an unplanned disconnection, the autonomous mode agent 230 may be configured to detect when connectivity is reestablished for a threshold period of time. The edge site 220 may automatically exit the autonomous mode based on the threshold and, in some embodiments, one or more parameters. The parameters may include network metrics, performance characteristics, and other types of parameters.

The autonomous mode agent 230 and performance/billing manager 216 may be configured to provide for management and tracking of the edge site 220 while the edge site is operating in autonomous mode. Management and tracking features of the edge site during autonomous operation may include the ability to modify or reconfigure software and data at the edge site. Additionally, the management and tracking features of the edge site may include the capability to observe and monitor system operation and health while the edge site is operating in autonomous mode. For example, the autonomous mode agent 230 and/or performance/billing manager 216 may monitor logs, metrics, KPIs, and other parameters.

In some embodiments, the edge site 220 may have an autonomous mode buffer 226 to record state data while the edge site 220 is operating in autonomous mode. The local orchestrator 234 may perform buffer management to ensure that data of interest is recorded and at an appropriate frequency and granularity. Data recording can be managed, in particular if the autonomous mode buffer 226 has a finite storage capacity. The local orchestrator 234 may employ various techniques to manage data recording to ensure that the most pertinent data is recorded and persisted. The techniques may include data rotation, automatic data aggregation/adaptation, and other techniques to avoid loss of data from data fall-off, for example if first-in-first-out recording is used.

The local orchestrator 234 may also adhere to a data prioritization scheme to ensure that higher priority data is recorded and persisted. One type of data that may be prioritized is billing data so that key metrics are captured that are used to bill services used at the edge site. For example, for 5G core services, billing may be based on the number of active users using the system, as well as the maximum throughput. Selected metrics may be captured to ensure that, even while in a disconnected state, the service provider can bill for usage. In the 5G core example, the local orchestrator 234 may ensure that the autonomous mode buffer 226 records and tracks the highest rate of both the number of active users using the system and the maximum throughput. Once the edge site is reconnected to the data center, the edge site can send those maximum values to the data center so that billing can be performed correctly. In such cases, when the edge site is to be disconnected for an extended time period, a high watermark may be logged for such parameters in order to avoid consuming storage capacity to continuously log values when the high watermark will suffice.

In some embodiments, the local orchestrator 234 and/or autonomous mode agent 230 may perform scaling of user services to manage capabilities due to reduced or lost connectivity. The local orchestrator 234 and/or autonomous mode agent 230 may further be configured to allow for new deployments while the edge site is disconnected. For example, deployment of new functions or updates to existing functions may be orchestrated by local orchestrator 234 while the edge site 220 is operating in autonomous mode.

In some embodiments, an identity and access manager 236 may perform identity and access management to allow for continued secure access by authorized users to access data and resources while the edge site 220 is operating in autonomous mode. In an embodiment, the identity and access manager 236 may cooperate with local orchestrator 234 so that the edge site 220 locally maintains sufficient functionality and information to identify and authenticate users that have access to applications, data, and systems or networks based on established access rights.

In some embodiments, the local orchestrator 234 and/or autonomous mode agent 230 may provide backdoor access to the edge site 220. In one embodiment, a backdoor access mechanism may be enabled during autonomous mode to enable authorized users to bypass security measures that may be in place when the edge site 220 is connected to data center 200. In some embodiments, the local orchestrator 234 and/or autonomous mode agent 230 may provide local management of sensitive data including secrets (e.g., certificates, keys). The local orchestrator 234 and/or autonomous mode agent 230 may cooperate with the data center 200 to maintain an updated set of secrets that are securely stored at the edge site 220. The local orchestrator 234 and/or autonomous mode agent 230 may further be configured to maintain key/certificate best practices during autonomous operation, including certificate rotation/renewal.

The local orchestrator 234 and/or autonomous mode agent 230 may be configured to provide continuous tracking of resource usage (e.g., for billing purposes) and various metrics to track performance during autonomous operation. This may include selection of key performance data as well as data granularity and frequency.

The local orchestrator 234 and/or autonomous mode agent 230 may be configured to ensure the continued delivery of services to users of the edge site 220, such as the ability to provide device to device communication services.

In an embodiment, the local orchestrator 234 and/or autonomous mode agent 230 and/or resource manager agent 232 may cooperate with the reconciliation system 212 and edge capacity orchestrator 210 to provide for reconciliation and resynchronization between the data center 210 and edge site 220 when connectivity is restored between the data center 210 and edge site 220. In various embodiments, reconciliation and resynchronization functionality provided by the local orchestrator 234 and/or autonomous mode agent 230 and/or resource manager agent 232 may include synchronization of states due to local edge state changes which are recorded while the edge site is in autonomous operation.

In an embodiment, local orchestrator 234 and/or autonomous mode agent 230 and/or resource manager agent 232 may cooperate with the reconciliation system 212 and edge capacity orchestrator 210 to perform specific synchronization actions which may be based on the disconnection time frame and parameters associated with the disconnection. For example, disconnects of shorter duration may result in full synchronization of data, whereas disconnects of longer durations that exceed a threshold may result in complete overwrite of the state data using the edge site's data.

In some embodiments, simulation techniques may be implemented to simulate interfaces to the data center 200 as well as other connected interfaces in order to facilitate autonomous operation of the edge site 200. In one embodiment, a digital twin may be implemented at the data center/cloud provider 200 and optionally at the edge site 220 to simulate operation of the edge site and/or the data center while the edge site is in autonomous mode.

In one embodiment, the edge capacity orchestrator 210 may intelligently place tasks and process at one or more edge sites 220 based on capacities, bandwidth, policies, and other inputs. In an embodiment, the local orchestrator 234 may communicate with the edge capacity orchestrator 210 to locally manage containers and other components running at the edge. The local orchestrator 234 and edge capacity orchestrator 210 may collectively monitor and manage available resources such as uplink and downlink capacity and computing capacity prior to the one or more edge sites 220 entering autonomous mode. The local orchestrator 234 may send information to the edge capacity orchestrator 210 that indicates the workload demands and availabilities at the edge. The edge capacity orchestrator 210 may analyze the information and send instructions to the edge sites 220 as to what processes should be run at the edge and if any changes are needed.

Within the confines of instructions provided by the edge capacity orchestrator 210, the local orchestrator 234 may locally manage workloads and other configurations at the edge sites 220 to efficiently utilize the available resources. The capacities at the edge sites 220 may continuously change, for example when new workloads are brought into the edge sites 220 (e.g., from local users at the edge network), and therefore the local compute capacity may change at any time. The local orchestrator 234 may provide the updated capacity information to the edge capacity orchestrator 210 which may generate updated instructions for redistributing workloads at the edge sites 220.

In some embodiments, various workload and other decisions that are made by the edge capacity orchestrator 210 may be delegated to the local orchestrator 234 during autonomous mode.

The present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Figure 3:
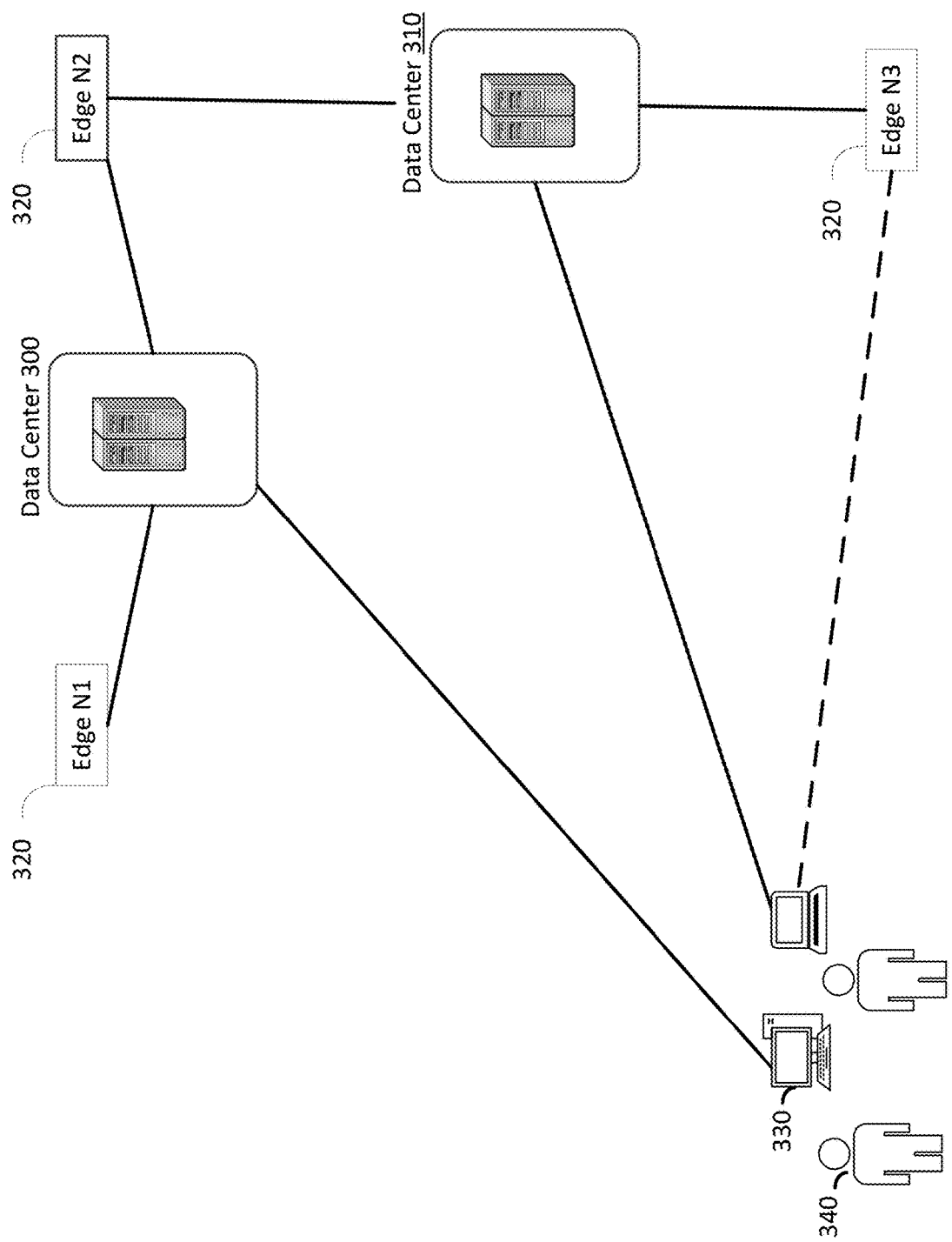
FIG. 3 is a diagram illustrating a data center in accordance with the present disclosure.

FIG. 3 illustrates one example where users of a data center in accordance with some embodiments. FIG. 3 illustrates data center 100 and 310 that are configured to provide computing resources to users 340 via user computers 330. The computing resources provided by data centers 100 and 310 may be cached or replicated at edge nodes 320. The computing resources provided by the data centers 100 and 310 and edge nodes 320 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

It should be appreciated that although the embodiments disclosed above are discussed in the context of virtual machines, other types of implementations can be utilized with the concepts and technologies disclosed herein. It should be also appreciated that the network topology illustrated in FIG. 3 has been greatly simplified and that many more networks and networking devices may be utilized to interconnect the various computing systems disclosed herein. These network topologies and devices should be apparent to those skilled in the art.

Figure 4A:
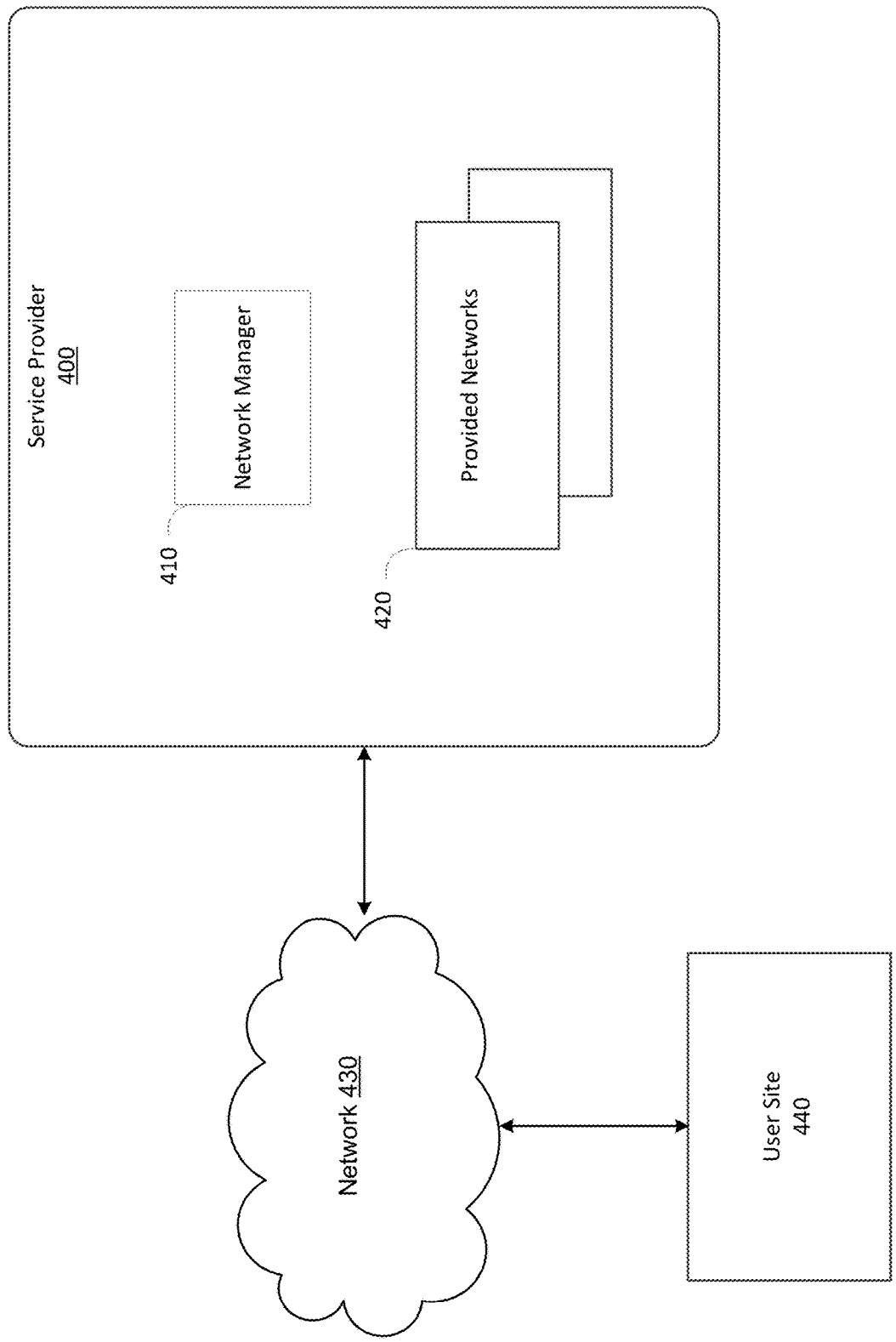
FIG. 4A is a diagram illustrating a data center and local resources in accordance with the present disclosure.
Figure 4B:
FIG. 4B is a diagram illustrating a data center and local resources in accordance with the present disclosure.

FIG. 4B illustrates an example computing environment in which the embodiments described herein may be implemented. FIG. 4B illustrates a service provider 400 that is configured to provide computing resources to users at user site 440. The user site 440 may have user computers that may access services provided by service provider 400 via a network 430. The computing resources provided by the service provider 400 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 400 may have various computing resources including servers, routers, and other devices that may provide remotely accessible computing and network resources using, for example, virtual machines. Other resources that may be provided include data storage resources. Service provider 400 may also execute functions that manage and control allocation of network resources, such as a network manager 410.

Network 430 may, for example, be a publicly accessible network of linked networks and may be operated by various entities, such as the Internet. In other embodiments, network 430 may be a private network, such as a dedicated network that is wholly or partially inaccessible to the public. Network 430 may provide access to computers and other devices at the user site 440.

FIG. 4B illustrates an example computing environment in which the embodiments described herein may be implemented. FIG. 4B illustrates that an edge site 450 may be implemented to extend the physical reach of service provider 400 to provide localized computing resources to users at user site 440 using provided networks 460. The computing resources provided by the edge site 450 may include some or all of the various types of resources provided by service provider 400. The resources at edge site 450 may be under the control of service provider 400.

Figure 5A:
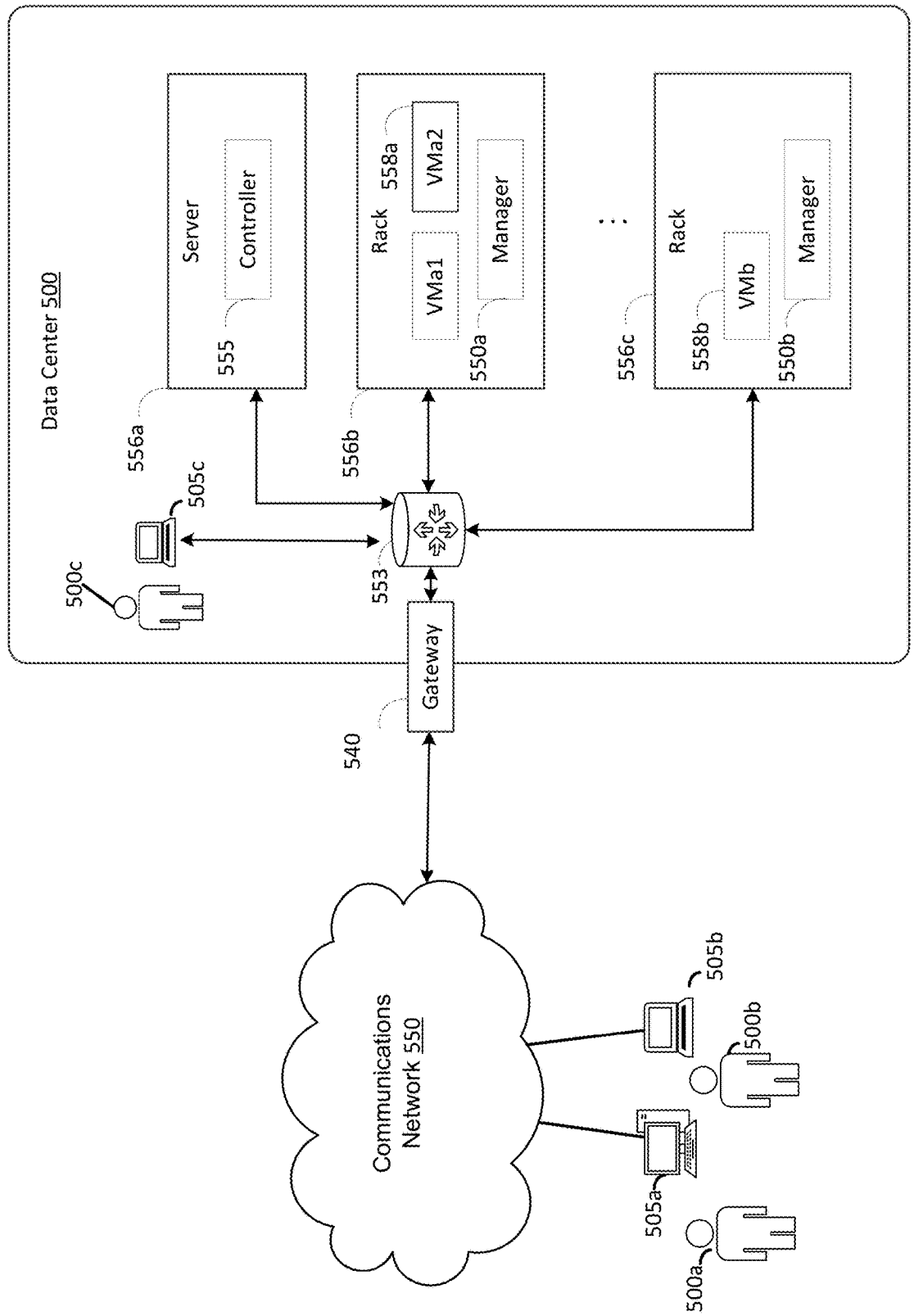
FIG. 5A is a diagram illustrating a data center and local resources in accordance with the present disclosure.

FIG. 5 illustrates an example computing environment in which the embodiments described herein may be implemented. FIG. 5 illustrates a data center 500 that is configured to provide computing resources to users 500a, 500b, or 500c (which may be referred herein singularly as "a user 500" or in the plural as "the users 500") via user computers 505a, 505b, and 505c (which may be referred herein singularly as "a computer 505" or in the plural as "the computers 505") via a communications network 550. The computing resources provided by the data center 500 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 500 may correspond to cloud provider 100 in FIG. 1, or edge sites and 2 120 130 of FIG. 1. Data center 500 may include servers 556a, 556b, and 556c (which may be referred to herein singularly as "a server 556" or in the plural as "the servers 556") that may be standalone or installed in server racks, and provide computing resources available as virtual machines 558a and 558b (which may be referred to herein singularly as "a virtual machine 558" or in the plural as "the virtual machines 558"). The virtual machines 558 may be configured to execute applications such as Web servers, application servers, media servers, database servers, and the like. Other resources that may be provided include data storage resources (not shown on FIG. 5) and may include file storage devices, block storage devices, and the like. Servers 556 may also execute functions that manage and control allocation of resources in the data center, such as a controller 555. Controller 555 may be a fabric controller or another type of program configured to manage the allocation of virtual machines on servers 556.

Referring to FIG. 5, communications network 550 may, for example, be a publicly accessible network of linked networks and may be operated by various entities, such as the Internet. In other embodiments, communications network 550 may be a private network, such as a corporate network that is wholly or partially inaccessible to the public.

Communications network 550 may provide access to computers 505. Computers 505 may be computers utilized by users 500. Computer 505a, 505b or 505c may be a server, a desktop or laptop personal computer, a tablet computer, a smartphone, a set-top box, or any other computing device capable of accessing data center 500. User computer 505a or 505b may connect directly to the Internet (e.g., via a cable modem). User computer 505c may be internal to the data center 500 and may connect directly to the resources in the data center 500 via internal networks. Although only three user computers 505a, 505b, and 505c are depicted, it should be appreciated that there may be multiple user computers.

Computers 505 may also be utilized to configure aspects of the computing resources provided by data center 500. For example, data center 500 may provide a Web interface through which aspects of its operation may be configured through the use of a Web browser application program executing on user computer 505. Alternatively, a stand-alone application program executing on user computer 505 may be used to access an application programming interface (API) exposed by data center 500 for performing the configuration operations.

Servers 556 may be configured to provide the computing resources described above. One or more of the servers 556 may be configured to execute a manager 550a or 550b (which may be referred herein singularly as "a manager 550" or in the plural as "the managers 550") configured to execute the virtual machines. The managers 550 may be a virtual machine monitor (VMM), fabric controller, or another type of program configured to enable the execution of virtual machines 558 on servers 556, for example.

It should be appreciated that although the embodiments disclosed above are discussed in the context of virtual machines, other types of implementations can be utilized with the concepts and technologies disclosed herein.

In the example data center 500 shown in FIG. 5, a network device 553 may be utilized to interconnect the servers 556a and 556b. Network device 553 may comprise one or more switches, routers, or other network devices. Network device 553 may also be connected to gateway 540, which is connected to communications network 550. Network device 553 may facilitate communications within networks in data center 500, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

It should also be appreciated that data center 500 described in FIG. 5 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 5B:
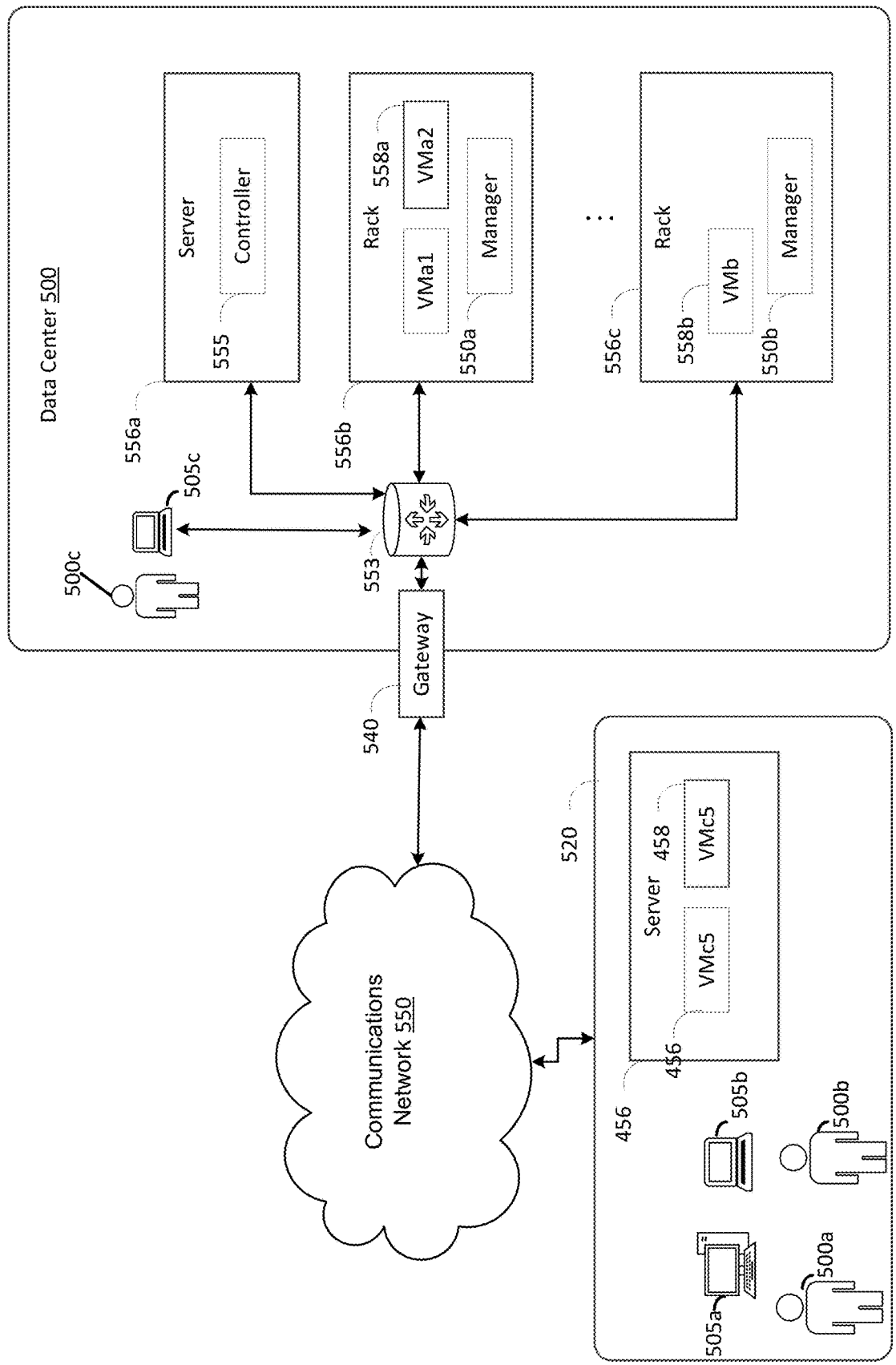
FIG. 5B is a diagram illustrating a data center and local resources in accordance with the present disclosure.

FIG. 5B illustrates an example computing environment illustrating integration of computing resources that include an edge site 520 that is geographically proximate to a facility local to users 500. In one embodiment, one or more servers 456 may be installed at the edge site 520. In an embodiment, servers 456 instantiate and run virtual machines 456 and 458.

In some embodiments, users 500 may specify configuration information for a virtual network to be provided for the user, with the configuration information optionally including a variety of types of information such as network addresses to be assigned to computing endpoints of the provided computer network, network topology information for the provided computer network, network access constraints for the provided computer network. The network addresses may include, for example, one or more ranges of network addresses, which may correspond to a subset of virtual or private network addresses used for the user's private computer network. The network topology information may indicate, for example, subsets of the computing endpoints to be grouped together, such as by specifying networking devices to be part of the provided computer network, or by otherwise indicating subnets of the provided computer network or other groupings of the provided computer network. The network access constraint information may indicate, for example, for each of the provided computer network's computing endpoints, which other computing endpoints may intercommunicate with the computing node endpoint, or the types of communications allowed to/from the computing endpoints.

Figure 6:
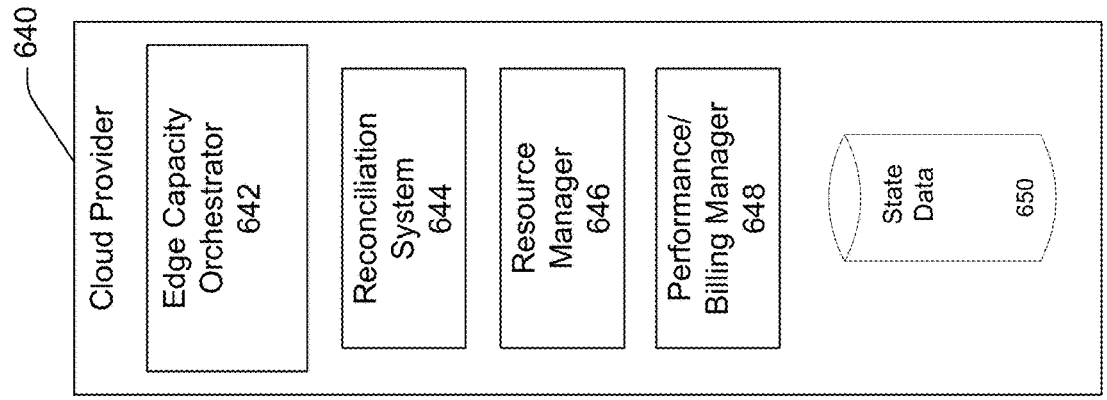
FIG. 6 is a diagram illustrating an architecture for managing resources in accordance with the present disclosure.
Figure 6:
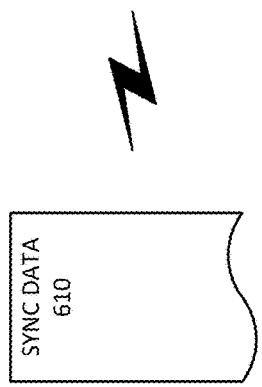
Figure 6:
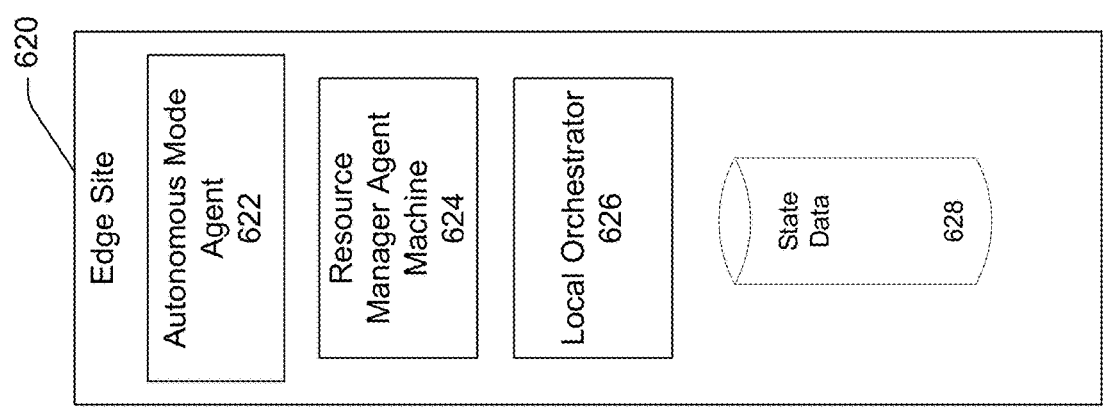

With reference to FIG. 6, illustrated is one example architecture for providing reconciliation and resynchronization between the data center 640 and edge site 620 in accordance with the present disclosure. In an embodiment, the architecture may include an edge site 620 that may include one or more resources. The edge site 620 may include local autonomous mode agent 622, which may be a service running on the edge site 620 and configured to monitor local resources and capacities. The autonomous mode agent 622 may be configured to track various state data at the edge site 620 and may monitor various metrics including maximum throughput and maximum number of users, etc. The current status of all state data may be sent to cloud provider 640 for performing synchronization actions as needed.

Autonomous mode agent 622 may be executed as a service running on the edge site 620. Autonomous mode agent 622 may be configured to receive requests for operations from edge capacity orchestrator 642 at the cloud provider 640. The autonomous mode agent 622 may perform the requested operations at the edge site 620. Local orchestrator 626 may distribute tasks among resources at the edge site 620.

The edge capacity orchestrator 642 may be located in the cloud provider 640. The edge capacity orchestrator 642 may be configured to receive synchronization data 610 pertaining to saved state information for resources at the edge site 620. The information may be used to determine whether state data from the edge site 620 stored at storage 628 should be synchronized with state data stored at storage 650.

Figure 7:
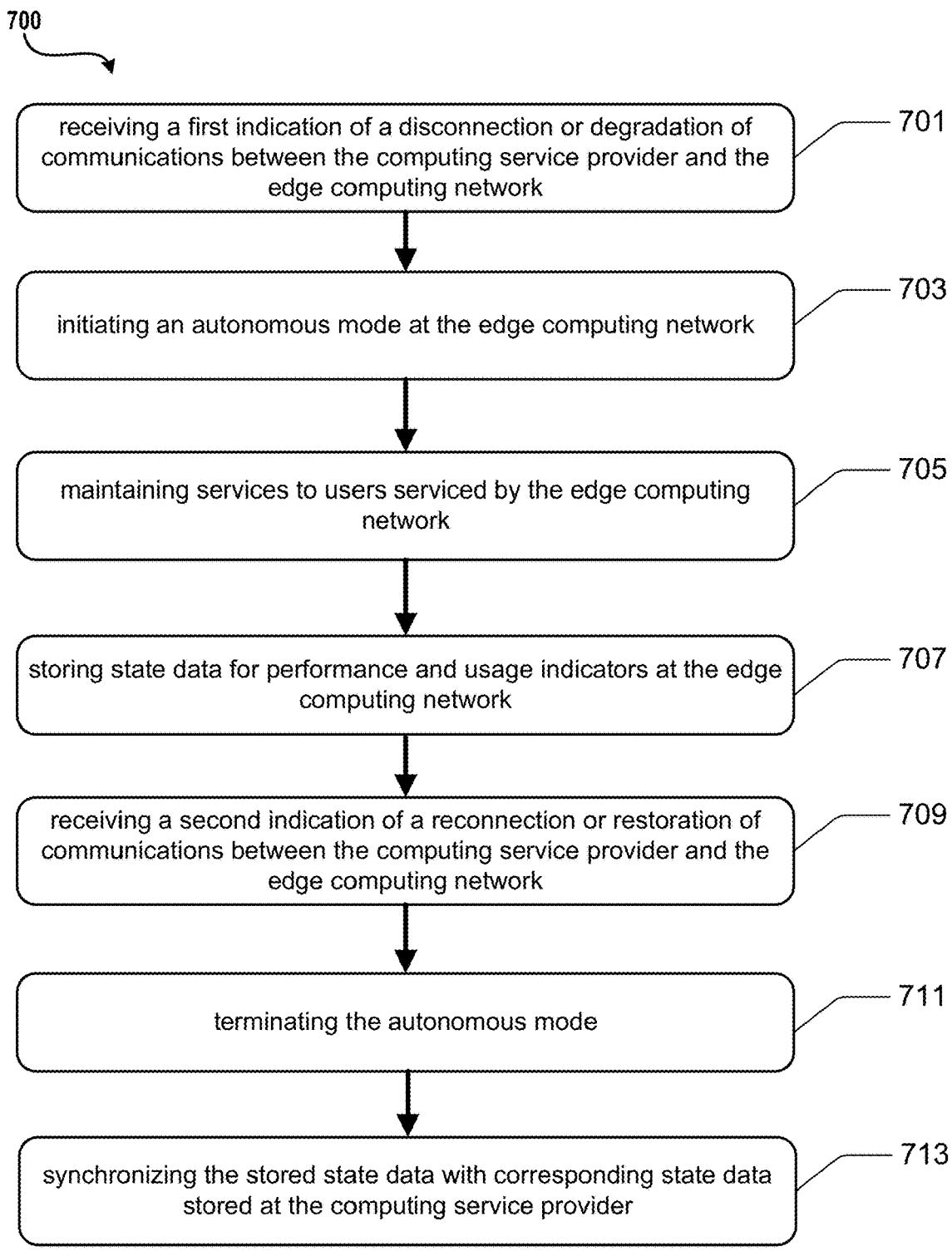
FIG. 7 is a flowchart depicting an example procedure for managing resources in accordance with the present disclosure.

Turning now to FIG. 7, illustrated is an example operational procedure for managing computing resources in accordance with the present disclosure. Such an operational procedure can be provided by one or more components illustrated in FIGS. 1 through 6. The operational procedure may be implemented in a computing environment comprising a computing service provider and an edge computing network. The edge computing network may comprise computing and storage devices configured to extend computing resources of the computing service provider to remote users of the computing service provider.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 700 is described as running on a system, it can be appreciated that the routine 700 and other operations described herein can be executed on an individual computing device or several devices.

Referring to FIG. 7, operation 701 illustrates receiving, by the edge computing network, a first indication of a disconnection or degradation of communications between the computing service provider and the edge computing network.

Operation 701 may be followed by operation 703. Operation 703 illustrates in response to receiving the first indication of the disconnection or degradation, initiating, by the edge computing network, an autonomous mode at the edge computing network. In an embodiment, wherein the autonomous mode enables the edge computing network to continue providing computing and network services at the edge computing network during the disconnection or degradation of communications between the computing service provider and the edge computing network.

Operation 703 may be followed by operation 705. Operation 705 illustrates while the edge computing network is operating in the autonomous mode, maintaining services to users serviced by the edge computing network, In an embodiment, the services are provided based on a capacity level determined by the autonomous mode.

Operation 705 may be followed by operation 707. Operation 707 illustrates while the edge computing network is operating in the autonomous mode, storing state data for performance and usage indicators at the edge computing network. In an embodiment, the state data are selectively stored based on a priority determined by the autonomous mode.

Operation 707 may be followed by operation 709. Operation 709 illustrates receiving a second indication of a reconnection or restoration of communications between the computing service provider and the edge computing network.

Operation 709 may be followed by operation 711. Operation 711 illustrates in response to receiving the second indication of the reconnection or restoration of communications between the computing service provider and the edge computing network, terminating, by the edge computing network, the autonomous mode.

Operation 711 may be followed by operation 713. Operation 713 illustrates in response to receiving the second indication of the reconnection or restoration of communications between the computing service provider and the edge computing network, synchronizing the stored state data with corresponding state data stored at the computing service provider, where coordination of the termination of the autonomous mode and the synchronization of the stored state data enables tracking of services provided by the edge computing network while the edge computing network was operating in the autonomous mode.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 8:
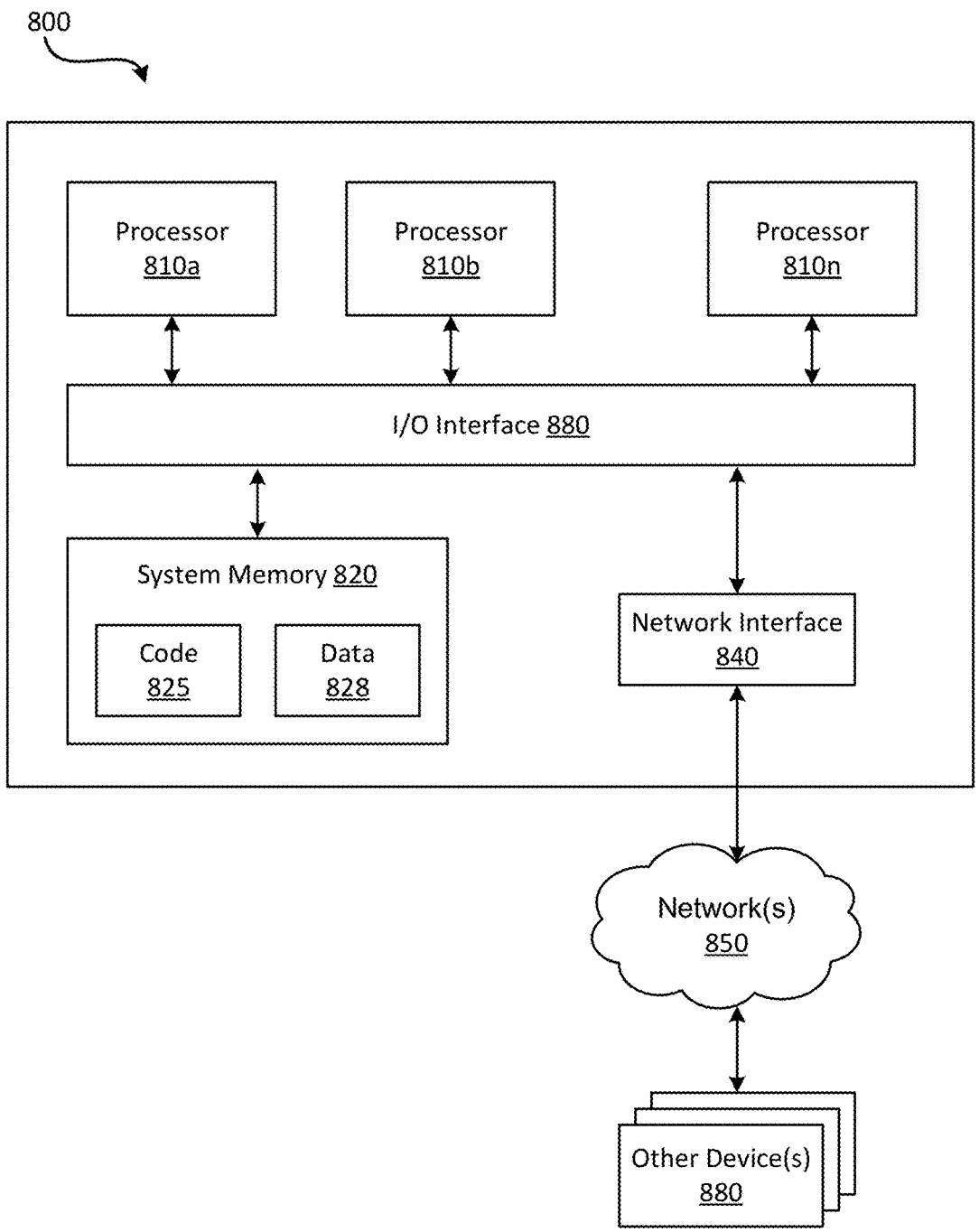
FIG. 8 is an example computing system in accordance with the present disclosure.

FIG. 8 illustrates a general-purpose computing device 800. In the illustrated embodiment, computing device 800 includes one or more processors 810a, 810b, and/or 810n (which may be referred herein singularly as "a processor 810" or in the plural as "the processors 810") coupled to a system memory 88 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the ×88, PowerPC, SPARC, or MIPS ISAs, or any other suitable ISA. In multiprocessor systems, each of processors 810 may commonly, but not necessarily, implement the same ISA.

System memory 88 may be configured to store instructions and data accessible by processor(s) 810. In various embodiments, system memory 88 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 820 as code 825 and data 828.

In one embodiment, I/O interface 830 may be configured to coordinate I/O traffic between the processor 810, system memory 88, and any peripheral devices in the device, including network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. Also, in some embodiments some or all of the functionality of I/O interface 830, such as an interface to system memory 820, may be incorporated directly into processor 810.

Network interface 840 may be configured to allow data to be exchanged between computing device 800 and other device or devices 880 attached to a network or network(s) 880, such as other computer systems or devices as illustrated in FIGS. 1 through 5, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for managing computing resources in a computing network comprising a computing service provider and an edge computing network, the edge computing network comprising computing and storage devices configured to extend computing services of the computing service provider to remote users of the computing service provider, the method comprising:
- receiving, by the edge computing network, a first indication of a disconnection or degradation of communications between the computing service provider and the edge computing network;
- in response to receiving the first indication of the disconnection or degradation, initiating, by the edge computing network, an autonomous mode at the edge computing network, wherein the autonomous mode enables the edge computing network to continue providing computing and network services at the edge computing network during the disconnection or degradation of communications between the computing service provider and the edge computing network;
- while the edge computing network is operating in the autonomous mode:
- maintaining services to users serviced by the edge computing network, wherein the services are provided based on a capacity level determined by the autonomous mode; and
- storing state data for performance and usage indicators at the edge computing network, wherein the state data are selectively stored based on a priority determined by the autonomous mode;
- receiving a second indication of a reconnection or restoration of communications between the computing service provider and the edge computing network; and
- in response to receiving the second indication of the reconnection or restoration of communications between the computing service provider and the edge computing network:
- terminating, by the edge computing network, the autonomous mode, and
- synchronizing the stored state data with corresponding state data stored at the computing service provider synchronizing the stored state data with corresponding state data stored at the computing service provider, where coordination of the termination of the autonomous mode and the synchronization of the stored state data enables tracking of services provided by the edge computing network while the edge computing network was operating in the autonomous mode.

Clause 2: The method of clause 1, further comprising executing an autonomous mode agent at the edge computing network, the autonomous mode agent configured to facilitate maintaining of the services.

Clause 3: The method of any of clauses 1-2, wherein the autonomous mode agent is configured to facilitate the storing of the state data.

Clause 4: The method of any of clauses 1-3, wherein the disconnection is a planned event.

Clause 5: The method of any of clauses 1-4, wherein the disconnection is caused by an unplanned loss of connectivity.

Clause 6: The method of any of clauses 1-5, wherein the indication is generated based on detection of the loss of connectivity by the edge computing network.

Clause 7: The method of clauses 1-6, wherein the autonomous mode agent is configured to observe and monitor system operation and health while the edge computing network is operating in the autonomous mode.

Clause 8: The method of any of clauses 1-7, wherein the autonomous mode agent is configured to perform identity and access management while the edge computing network is operating in the autonomous mode.

Clause 9: An edge computing network configured to extend computing resources of a computing service provider to remote users of the computing service provider, the edge computing network comprising:
- one or more computing devices; and
- one or more storage devices, at least one of the storage devices storing computer-readable instructions that, when executed by a processor of the computing devices, cause the edge computing network to perform operations comprising:
- receiving, by the edge computing network, an indication of a disconnection of communications between the computing service provider and the edge computing network;
- in response to the indication, initiating, by the edge computing network, an autonomous mode at the edge computing network, wherein the edge computing network is configured to continue providing computing and network services at the edge computing network while the edge computing network is operating in the autonomous mode;
- while the edge computing network is operating in the autonomous mode:
- maintaining services to users serviced by the edge computing network, wherein the services are provided based on a capacity level determined by the autonomous mode; and
- storing state data for performance and usage indicators at the edge computing network, wherein the state data are selectively stored based on a priority determined by the autonomous mode;
- receiving, by the edge computing network, an indication of a reconnection of communications between the computing service provider and the edge computing network; and
- in response to the indication, terminating, by the edge computing network, the autonomous mode; and
- using the stored state data for the performance and usage indicators to synchronize the stored state data with corresponding state data stored at the computing service provider.

Clause 10: The edge computing network of clause 9, further comprising computer-readable instructions stored thereupon that, when executed by the one or more processors, cause the system to perform operations comprising:
- scaling the services based on capacity of the edge computing network while operating in the autonomous mode.

Clause 11: The edge computing network of any of clauses 9 and 10, wherein the synchronizing is performed based on a length of time that the computing network was operating in the autonomous mode.

Clause 12: The edge computing network of any clauses 9-11, further comprising an autonomous mode buffer configured to store the state data using buffer management to implement the priority.

Clause 13: The edge computing network of any clauses 9-12, wherein the state data is stored according to a high water mark for selected state parameters.

Clause 14: A computer-readable storage medium having computer-executable instructions stored thereupon which, when executed by one or more processors of a computing device, cause the computing device to:
- receive, by an edge computing network, an indication of a disconnection of communications between a computing service provider and the edge computing network, the edge computing network comprising computing and storage devices configured to extend computing resources of the computing service provider to remote users of the computing service provider;
- in response to the indication, initiate, by the edge computing network, an autonomous mode at the edge computing network, wherein the edge computing network is configured to continue providing computing and network services at the edge computing network while the edge computing network is operating in the autonomous mode;
- while the edge computing network is operating in the autonomous mode:
- maintain services to users serviced by the edge computing network, wherein the services are provided based on a capacity level determined by the autonomous mode; and
- store state data for performance and usage indicators at the edge computing network, wherein the state data are selectively stored based on a priority determined by the autonomous mode;
- receive, by the edge computing network, an indication of a reconnection of communications between the computing service provider and the edge computing network; and
- in response to the indication, terminate, by the edge computing network, the autonomous mode; and
- using the stored state data for the performance and usage indicators to synchronize the stored state data with corresponding state data stored at the computing service provider.

Clause 15: The computer-readable storage medium of clause 14, further comprising computer-executable instructions stored which, when executed by one or more processors of a computing device, cause the computing device to activate a backdoor access mechanism configured to enable authorized users to bypass security measures that were be in place prior to the disconnection.

Clause 16: The computer-readable storage medium of any of clauses 14 and 15, further comprising computer-executable instructions stored which, when executed by one or more processors of a computing device, cause the computing device to maintain an updated set of secrets that are securely stored at the edge computing network.

Clause 17: The computer-readable storage medium of any of the clauses 14-16, wherein synchronizing comprises selection of one or more synchronization actions based on a time frame of the disconnection and parameters associated with the disconnection.

Clause 18: The computer-readable storage medium of any of the clauses 14-17, further comprising computer-executable instructions stored which, when executed by one or more processors of a computing device, cause the computing device to execute an autonomous mode agent at the edge computing network, the autonomous mode agent configured to facilitate maintaining of the services.

Clause 19: The computer-readable storage medium of any of the clauses 14-18, further comprising computer-executable instructions stored which, when executed by one or more processors of a computing device, cause the computing device to execute a resource manager agent configured to monitor status of resources at the edge computing network.

Clause 20: The computer-readable storage medium of any of the clauses 14-19, further comprising computer-executable instructions stored which, when executed by one or more processors of a computing device, cause the computing device to detect when connectivity between the edge computing network and computing service provider is reestablished for a threshold period of time.

The invention claimed is:

1. A method for managing computing resources in a computing network comprising a computing service provider and an edge computing network, the edge computing network comprising computing and storage devices configured to extend computing services of the computing service provider to remote users of the computing service provider, the method comprising:
- receiving, by the edge computing network, a first indication of a disconnection or degradation of communications between the computing service provider and the edge computing network;
- in response to receiving the first indication of the disconnection or degradation, initiating, by the edge computing network, an autonomous mode at the edge computing network, wherein the autonomous mode enables the edge computing network to continue providing computing and network services to user devices serviced by the edge computing network during the disconnection or degradation of communications between the computing service provider and the edge computing network;
- while the edge computing network is operating in the autonomous mode:
- maintaining services to users serviced by the edge computing network, wherein the services are provided based on a capacity level determined by the autonomous mode; and
- storing state data for performance and usage indicators at the edge computing network, wherein the state data is indicative of local edge computing network state changes while the edge computing network is operated in the autonomous mode and wherein the state data is selectively stored based on a priority determined by the autonomous mode;
- receiving a second indication of a reconnection or restoration of communications between the computing service provider and the edge computing network; and
- in response to receiving the second indication of the reconnection or restoration of communications between the computing service provider and the edge computing network:
- terminating, by the edge computing network, the autonomous mode, and
- synchronizing the stored state data with corresponding state data stored at the computing service provider, where coordination of the termination of the autonomous mode and the synchronization of the stored state data enables tracking of services provided to the user devices serviced by the edge computing network while the edge computing network was operating in the autonomous mode.

2. The method of claim 1, further comprising executing an autonomous mode agent at the edge computing network, the autonomous mode agent configured to facilitate maintaining of the services.

3. The method of claim 2, wherein the autonomous mode agent is configured to facilitate the storing of the state data.

4. The method of claim 1, wherein the disconnection is a planned event.

5. The method of claim 1, wherein the disconnection is caused by an unplanned loss of connectivity.

6. The method of claim 5, wherein the indication is generated based on detection of the loss of connectivity by the edge computing network.

7. The method of claim 2, wherein the autonomous mode agent is configured to observe and monitor system operation and health while the edge computing network is operating in the autonomous mode.

8. The method of claim 2, wherein the autonomous mode agent is configured to perform identity and access management while the edge computing network is operating in the autonomous mode.

9. An edge computing network configured to extend computing resources of a computing service provider to remote users of the computing service provider, the edge computing network comprising:
one or more computing devices; and
one or more storage devices, at least one of the storage devices storing computer-readable instructions that, when executed by a processor of the computing devices, cause the edge computing network to perform operations comprising:
receiving, by the edge computing network, a first indication of a disconnection of communications between the computing service provider and the edge computing network;
in response to the first indication, initiating, by the edge computing network, an autonomous mode at the edge computing network, wherein the edge computing network is configured to continue providing computing and network services to user devices serviced by the edge computing network while the edge computing network is operating in the autonomous mode;
while the edge computing network is operating in the autonomous mode:
maintaining services to users serviced by the edge computing network, wherein the services are provided based on a capacity level determined by the autonomous mode; and
storing state data for performance and usage indicators at the edge computing network, wherein the state data is indicative of computing network state changes while the edge computing network is operated in the autonomous mode and wherein the state data is selectively stored based on a priority determined by the autonomous mode;
receiving, by the edge computing network, a second indication of a reconnection of communications between the computing service provider and the edge computing network; and
in response to the second indication, terminating, by the edge computing network, the autonomous mode; and
using the stored state data for the performance and usage indicators to synchronize the stored state data with corresponding state data stored at the computing service provider.

10. The edge computing network of claim 9, further comprising computer-readable instructions stored thereupon that, when executed by the one or more processors, cause the edge computing network to perform operations comprising: scaling the services based on capacity of the edge computing network while operating in the autonomous mode.

11. The edge computing network of claim 9, wherein the synchronizing is performed based on a length of time that the edge computing network was operating in the autonomous mode.

12. The edge computing network of claim 9, further comprising an autonomous mode buffer configured to store the state data using buffer management to implement the priority.

13. The edge computing network of claim 9, wherein the state data is stored according to a high water mark for selected state parameters.

14. A computer-readable storage medium having computer-executable instructions stored thereupon which, when executed by one or more processors of a computing device, cause the computing device to:
receive, by an edge computing network, a first indication of a disconnection of communications between a computing service provider and the edge computing network, the edge computing network comprising computing and storage devices configured to extend computing resources of the computing service provider to remote users of the computing service provider;
in response to the first indication, initiate, by the edge computing network, an autonomous mode at the edge computing network, wherein the edge computing network is configured to continue providing computing and network services to user devices serviced by the edge computing network while the edge computing network is operating in the autonomous mode;
while the edge computing network is operating in the autonomous mode:
maintain services to users serviced by the edge computing network, wherein the services are provided based on a capacity level determined by the autonomous mode; and
store state data for performance and usage indicators at the edge computing network, wherein the state data is indicative of local edge computing network state changes while the edge computing network is operated in the autonomous mode and wherein the state data is selectively stored based on a priority determined by the autonomous mode;
receive, by the edge computing network, a second indication of a reconnection of communications between the computing service provider and the edge computing network; and
in response to the second indication, terminate, by the edge computing network, the autonomous mode; and
using the stored state data for the performance and usage indicators to synchronize the stored state data with corresponding state data stored at the computing service provider.

15. The computer-readable storage medium of claim 14, further comprising computer-executable instructions stored which, when executed by one or more processors of a computing device, cause the computing device to activate a backdoor access mechanism configured to enable authorized users to bypass security measures that were in place prior to the disconnection.

16. The computer-readable storage medium of claim 14, further comprising computer-executable instructions stored which, when executed by one or more processors of a computing device, cause the computing device to maintain an updated set of secrets that are securely stored at the edge computing network.

17. The computer-readable storage medium of claim 14, wherein synchronizing comprises selection of one or more synchronization actions based on a time frame of the disconnection and parameters associated with the disconnection.

18. The computer-readable storage medium of claim 14, further comprising computer-executable instructions stored which, when executed by one or more processors of a computing device, cause the computing device to execute an autonomous mode agent at the edge computing network, the autonomous mode agent configured to facilitate maintaining of the services.

19. The computer-readable storage medium of claim 14, further comprising computer-executable instructions stored which, when executed by one or more processors of a computing device, cause the computing device to execute a resource manager agent configured to monitor status of resources at the edge computing network.

20. The computer-readable storage medium of claim 14, further comprising computer-executable instructions stored which, when executed by one or more processors of a computing device, cause the computing device to detect when connectivity between the edge computing network and the computing service provider is reestablished for a threshold period of time.

* * * * *